United States Patent [19]

Takahashi et al.

[11] 4,345,826

[45] Aug. 24, 1982

[54] SHUTTER SPEED SETTING AND DISPLAY APPARATUS

[75] Inventors: Akira Takahashi; Masanori Hashimoto, both of Tokyo, Japan

[73] Assignee: Ricoh Company, Ltd., Japan

[21] Appl. No.: 107,404

[22] Filed: Dec. 26, 1979

Related U.S. Application Data

[63] Continuation of Ser. No. 928,682, Jul. 27, 1978, abandoned.

[30] Foreign Application Priority Data

Jul. 27, 1977 [JP] Japan ............................. 52-90169
Sep. 20, 1977 [JP] Japan ............................. 52-113030
Sep. 20, 1977 [JP] Japan ............................. 52-113031

[51] Int. Cl.$^3$ .......................... G03B 9/62; G03B 17/18
[52] U.S. Cl. .................................. 354/23 D; 354/50;
354/60 L; 354/234; 354/289
[58] Field of Search ............... 354/23 D, 32, 33, 34,
354/50, 53, 60 R, 60 E, 60 L, 60 F, 128, 139,
149, 234, 235, 289

[56] References Cited

U.S. PATENT DOCUMENTS

| | | | |
|---|---|---|---|
| 3,593,637 | 7/1971 | Fahlenberg et al. | 354/235 |
| 3,995,284 | 11/1976 | Kitaura et al. | 354/23 D |
| 4,021,828 | 5/1977 | Jura et al. | 354/289 X |
| 4,083,059 | 4/1978 | Tsunekawa et al. | 354/149 |
| 4,091,396 | 5/1978 | Sahara et al. | 354/60 F X |
| 4,107,708 | 8/1978 | Saito et al. | 354/23 D X |
| 4,117,499 | 9/1978 | Strauss | 354/23 D |
| 4,121,231 | 10/1978 | Taguchi et al. | 354/60 L X |
| 4,153,358 | 5/1979 | Yamada | 354/23 D X |

*Primary Examiner*—Michael L. Gellner
*Attorney, Agent, or Firm*—McGlew and Tuttle

[57] ABSTRACT

A shutter speed setting and display apparatus for use with a single-lens reflex camera comprises a shutter speed variation apparatus, a shutter speed setting apparatus and a shutter speed display apparatus. The shutter speed variation apparatus produces count signals and applies the signals to the shutter speed setting apparatus for setting the shutter speed and, as the shutter speed display apparatus, a digital display apparatus can be employed, which displays either a shutter speed set by the shutter speed variation apparatus or a shutter speed determined by an automatic exposure measurement circuit or both. To this shutter speed setting and display apparatus, a flashlight source detecting apparatus and a shutter speed restricting apparatus can be attached for restricting the shutter speed to be set by the shutter speed which is to be set by the shutter speed variation apparatus in a synchronizing range of the flashlight source with a shutter of the camera.

6 Claims, 15 Drawing Figures

SHUTTER SPEED SETTING AND DISPLAY APPARATUS

This is a continuation of application Ser. No. 928,682 filed July 27, 1978, now abandoned.

BACKGROUND OF THE INVENTION

The present invention relates to a shutter speed setting and display apparatus for use with a single-lens reflex camera.

In the single-lens reflex camera, when an appropriate exposure is obtained by changing the shutter speed with its diaphragm fixed, namely in a diaphragm priority mode, the shutter speed is usually changed while looking into a viewfinder of the camera, and conventionally, a shutter speed setting and display apparatus is designed in such a manner that, the moment a shutter speed is set manually by a shutter dial, the set shutter speed is displayed in the first display apparatus of the viewfinder and, the moment a shutter speed is automatically set by measuring the brightness of a subject with an exposure measurement circuit, the thus set shutter speed is displayed in the second display apparatus of the viewfinder, so that the manually set shutter speed is then made to coincide with the shutter speed set by the exposure measurement circuit. In a shutter speed setting and display apparatus of this type, it is convenient that the manually set shutter speed is known from the first display apparatus and that the shutter speed set by the exposure measurement circuit is known from the second display apparatus. The shutter speeds however are displayed by use of two display apparatuses. This makes the shutter speed setting apparatus complicated in its mechanism and expensive.

Furthermore, in the conventional shutter speed setting and display apparatus, the shutter speed is changed by rotating the shutter dial and the operation of the shutter dial is a different kind of operation from the operation of depressing a shutter release button. Therefore, the photographer sometimes lets a good shutter chance go due to the incapability of moving his fingers smoothly in operation. Moreover, in such shutter speed setting and display apparatus, supposing it is designed so as to select 15 different shutter speeds, the number of wires connecting the shutter dial to the body of the shutter speed setting and display apparatus amounts to 15 and goes as high as 16, including a common terminal. Therefore, the pins for an integrated circuit contained in the body of the shutter speed setting and display apparatus become too many so that the apparatus becomes expensive. Furthermore, in the camera of the above-mentioned type, when a subject is dark, a stroboscope is employed wherein the stroboscope is synchronized with the shutter of the camera. The flashlight source of the stroboscope however, cannot be synchronized in the whole range in which the shutter speed setting is possible. Therefore, in the case where the shutter speed is manually set, the shutter speed has to be set by checking the range in which the synchronizing of the flashlight source is possible. This is inconvenient in operating the camera.

Occasionally, there is a fear that the shutter speed is set outside the synchronizing range of the flashlight without checking the range. In such a case, a poor photographing occurs since the flashlight source does not synchronize with the shutter.

SUMMARY OF THE INVENTION

It is an object of the present invention to provide a shutter speed setting and display apparatus in which the shutter speed, which is set manually by the shutter speed setting and display apparatus and the output of an exposure measurement circuit are displayed in a digital display apparatus.

Another object of the invention is to provide a shutter speed setting and display apparatus in which the shutter speed setting and display can be changed by a button switch. More specifically, the shutter speed can be changed in both the directions of increasing and decreasing shutter speed. In one embodiment of the invention, the shutter speed is continually changed as long as the button switch is kept depressed. In a system allowing for the changing of the shutter speed in one direction, the number of wires connecting the button switch to the body of the film speed setting and display apparatus is $1+1$, while in the system allowing for the changing of shutter speed in both directions, the number of the wires is $2+1$, whereby, when an integrated circuit is employed, the number of the pins of the integrated circuit can be decreased.

A further object of the invention is to provide a shutter speed setting and display apparatus having a flashlight source detecting means for detecting whether or not a flashlight source is attached to the camera, which can restrict the setting range of the shutter speed in the range in which the flashlight source can be synchronized with the shutter. This makes it possible to set the shutter speed manually the shutter speed without taking into consideration the synchronizing range of the flashlight source.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
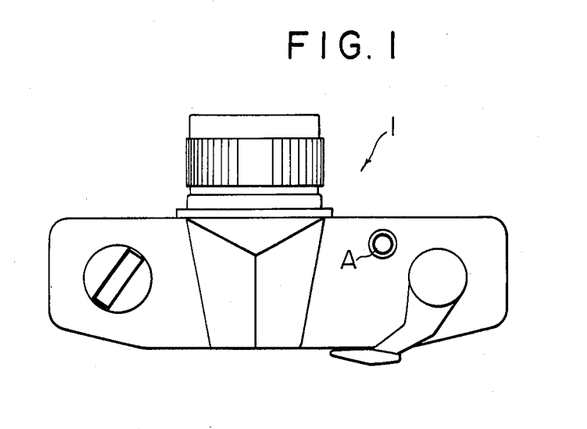
FIG. 1 is a schematic top view of a camera employed in an embodiment of the present invention.
Figures 2, 5:
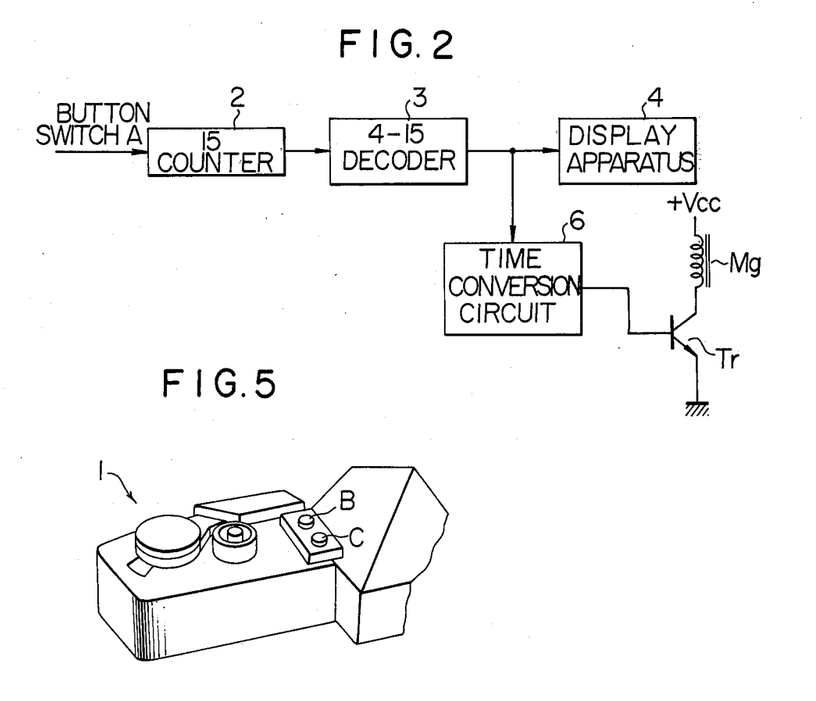
FIG. 2 is a block diagram of the above-mentioned embodiment of the invention.
FIG. 5 is a fragmentary perspective view of a camera employed in another embodiment of the invention.

Referring to FIG. 1, there is shown a single-lens reflex camera 1 in which a shutter speed variation means is disposed in the form of a switch button A for setting shutter speed manually. Whenever the switch button A is depressed, the setting value of the shutter speed and its display are shifted step by step in one direction for each button A depression. Referring to FIG. 2, one of the most frequently used shutter speeds, for instance, 1/125 sec. is preset in a 15 step counter 2 when a switch of a power source (not shown) of the camera is turned on. The preset information is decoded by a 4-15 decoder 3 and is displayed in a viewfinder by a display apparatus 4. Counter 2 and decoder 3 comprise shutter speed setting means as hereinafter to be described. To be more specific, referring to FIG. 3, one of the light emission diodes $LED_1$ to $LED_{15}$, which comprise display means, is lighted by an output of the decoder 3, so that one shutter speed index out of the possible index range shown of 1000 to B, is indicated and one shutter speed corresponding to the shutter speed index out of the 15 possible shutter speeds from 1/1000 sec. to a bulb setting, is displayed. Referring now back to FIG. 2, the 15 counter 2 changes its number in a sequence of 1, 2, 3, . . . 15, 1, 2, . . . by counting a signal from the switch button A. Therefore, a desired shutter speed can be set in the 15 counter 2 by depressing the switch button A a number of times while watching the display unit 4 through the viewfinder 5. Shutter operating means in the form of a time converter circuit 6 converts the output of the 4-15 decoder 3 into a shutter speed, whereby a transistor Tr is actuated. To be more specific, when a period of time corresponding to the output of the 4-15 decoder 3 and the speed chosen has passed after the start of a front blind of a shutter (not shown) of this camera, the transistor Tr is actuated and a magnet Mg is energized, whereby a back blind of the shutter is released.

Figure 4:
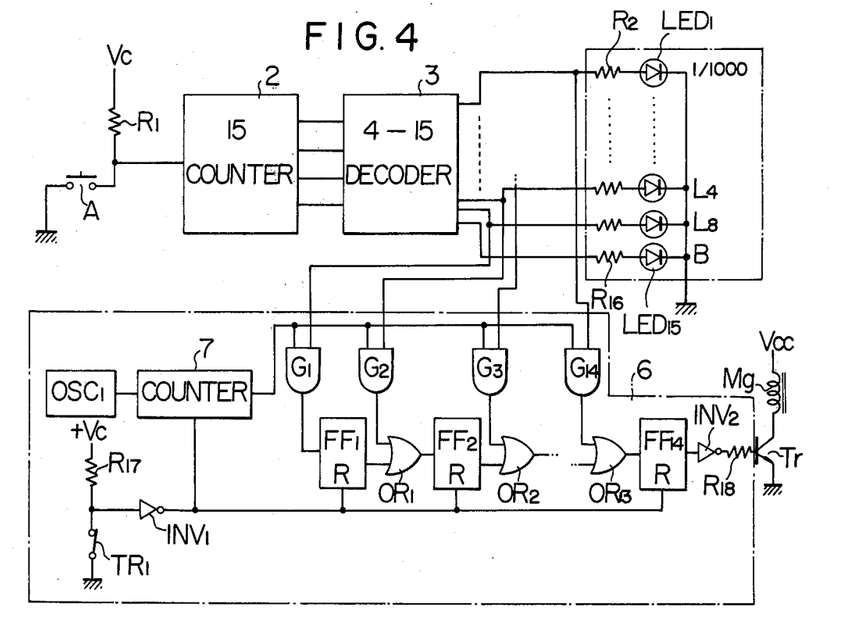
FIG. 4 is a circuit diagram of the above-mentioned embodiment of the invention.

Referring to FIG. 4, the switch button A is employed in combination with a resistor R1 and, whenever the switch button A is on, a count signal is generated and is applied to the 15 counter 2. In the display unit 4, light emission diodes $LED_1$ to $LED_{15}$ are connected between a ground and the respective output terminals of the 4-15 decoder 3. Resistors $R_2$ to $R_{16}$ are disposed between the respective output terminals of the 4-15 decoder 3 and the diodes $LED_1$ to $LED_{15}$. The time converter circuit 6 comprises a trigger switch TRI, a resistor $R_{17}$ and an inverter $INV_1$. Inverter INV. normally resets a 4-bit counter 7 for preventing chance errors and flip-flop circuits $FF_1$ to $FF_{14}$ by an output of the inverter $INV_1$ when the trigger switch is on. When the trigger switch TRI is turned off by the running of the front blind of the shutter however, the resetting of the 4-bit counter 7 and the flip-flop circuits $FF_1$ to $FF_{14}$ is released. Together with the release of the resetting, the counter 7 begins to count clock pulses from an oscillator $OSC_1$. The output of the counter 7 is applied to the flip-flop $FF_1$ through logic elements such as an AND gate $G_1$ and, at the same time, to the flip-flop $FF_2$ to $FF_{14}$ through AND gates $G_2$ to $G_{14}$ and OR circuits $OR_1$ to $OR_{13}$, respectively. The AND gates $G_1$ to $G_{14}$ are opened by each output of the decoder 3 corresponding to a shutter speed of 8 sec. to 1/1000 sec., and outputs of the flip-flops $FF_1$ to $FF_{13}$ are respectively applied to the flip-flops of $FF_2$ to $FF_{14}$ through the respective OR circuits $OR_1$ to $OR_{13}$.

Therefore, the output of the flip-flop $FF_{14}$ is generated after a period of time corresponding to the output of the decoder 3 after the trigger switch TRI is switched off and is then applied to the transistor Tr through an inverter INV and a resistor $R_{18}$. Therefore, when the magnet is deenergized with the transistor Tr off, the back blind is released. Transistor Tr and magnet Mg are associated with a camera shutter and comprise means for opening the same.

Figure 6:
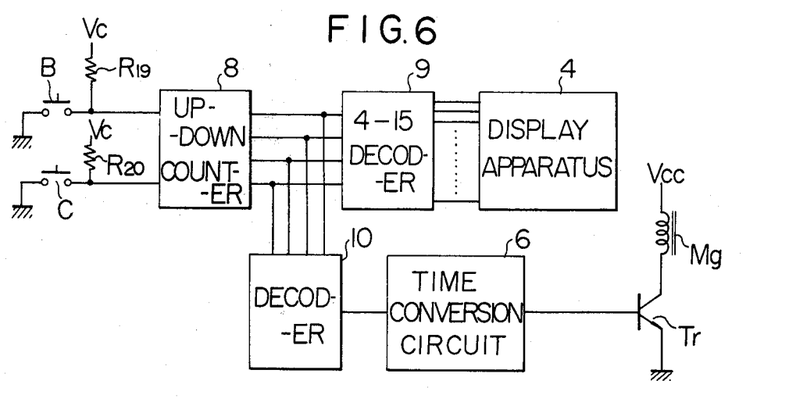
FIGS. 6 to 8 are block diagrams of further embodiments of the invention.

In another embodiment of the invention, as shown in FIG. 5, two switch buttons B and C for setting the shutter speed manually are provided in the above-mentioned embodiment, and an up-down counter 8 is employed instead of the 15 counter as shown in FIG. 6. A count signal is applied to the up-down counter 8 by a circuit comprising a button switch B and a resistor $R_{19}$, whenever the button switch B is depressed in such manner that the up-down counter 8 counts up. Whenever the button switch C is depressed, a count signal is applied to the up-down counter 8 by a circuit comprising a button switch C and a resistor $R_{20}$ so that the up-down counter 8 counts down. Therefore, by the button switch B, the shutter speed can be decreased and, by the button C, the shutter speed can be increased, so that the number of times the button switches must be depressed before setting a desired shutter speed is reached is less than that in the above-mentioned embodiment. The output of the up-down counter 8 is decoded by a 4-15 decoder 9 and is applied to the display apparatus 4 and, at the same time, the output of the up-down counter 8 is decoded by a 4-15 decoder 10 and is applied to the time converter circuit 6.

Figure 7:
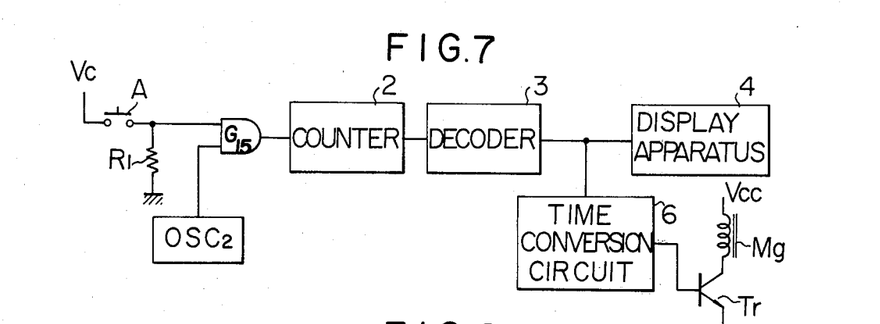

Referring to FIG. 7, in a further embodiment of the invention, a count signal is applied by an oscillator $OSC_2$ to the 15 counter 2 through an AND gate $G_{15}$ which is opened by a signal from a circuit comprising the button switch A and the resistor $R_1$ in the first embodiment of the invention. Therefore, so long as the button switch A is depressed continuously, the shutter speed is continuously changed.

Figure 8:
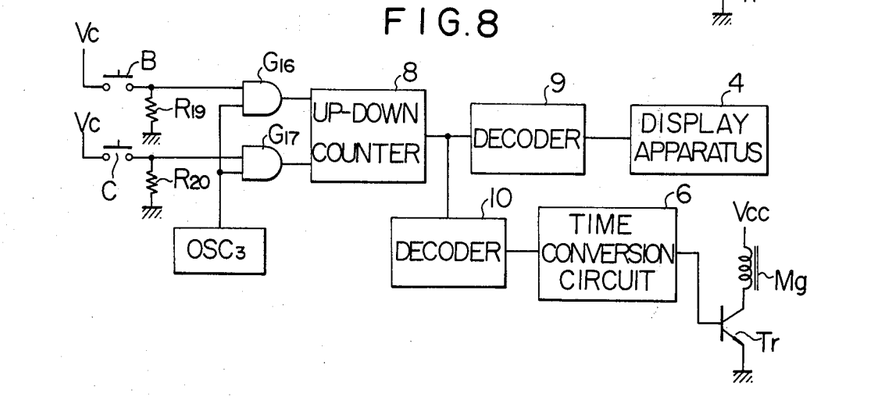

Referring to FIG. 8 which shows a further embodiment of the invention, in the above-mentioned second embodiment, the up-down counter 8 counts up by a signal applied thereto from an oscillator $OSC_3$ through an AND gate $G_{16}$ and counts down by a signal applied thereto from the oscillator $OSC_3$ through an AND gate $G_{17}$. The AND gate $G_{16}$ is opened by a signal from a circuit comprising the button switch B and a resistor $R_{19}$, while the AND gate $G_{17}$ is opened by a signal from a circuit comprising the button switch C and a resistor $R_{20}$.

Figure 9:
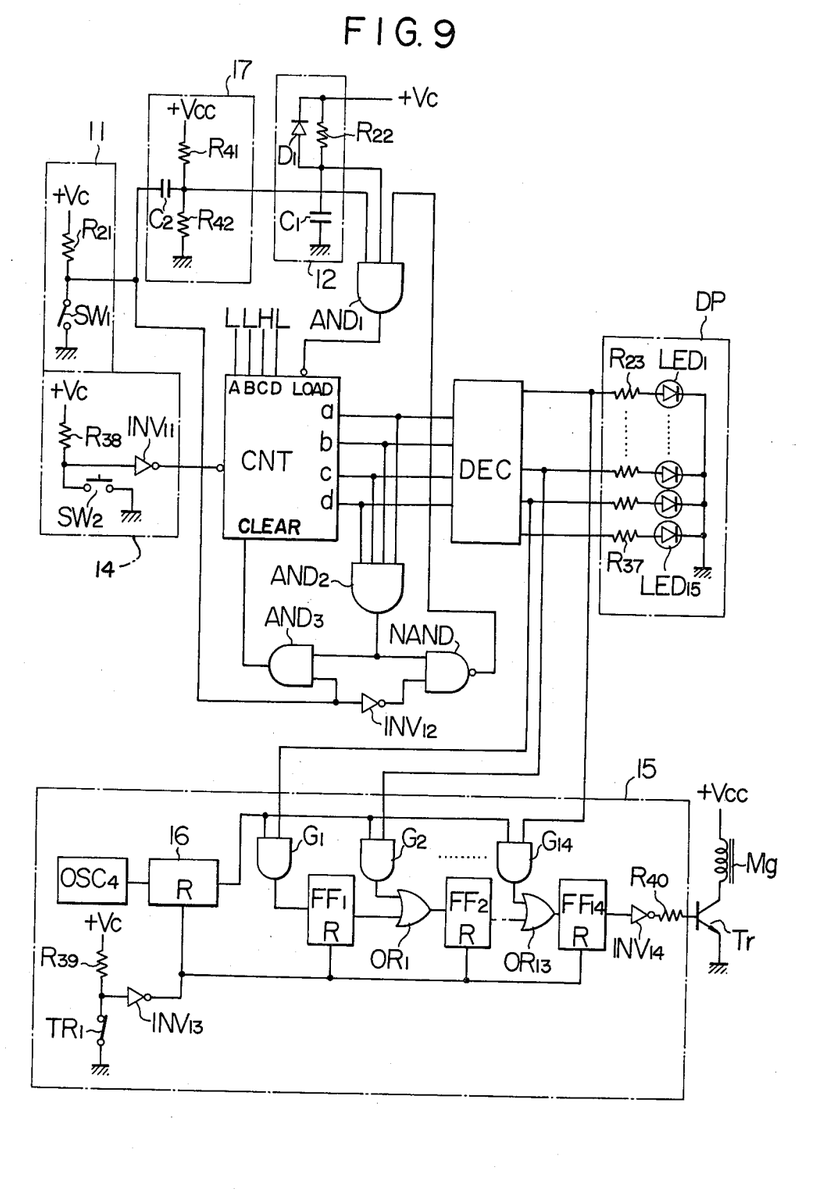
FIG. 9 is a circuit diagram of a further embodiment of the invention.

Referring to FIG. 9, in a single-lens reflex camera, when a stroboscope is not attached, switch $SW_1$ is off, and an output of a circuit comprising the switch $SW_1$ and a resistor $R_{21}$ becomes high in potential (hereafter this state is represented by H) when a power supply for the camera is engaged. When the power supply is put to work, for instance, by a film winding up lever, a circuit 12 comprising a resistor $R_{22}$, capacitor $C_1$ and a diode $D_1$ temporarily becomes low in potential (hereafter this state is represented by L), so that the output of an AND circuit $AND_1$ is L. Therefore, in a 4-bit counter CNT, the LOAD terminal becomes L, so that data are introduced into to A to D terminals from a data input circuit (not shown). The counter CNT is for setting a shutter speed by the data relating to the shutter speed applied thereto, and the relationship between the data and the shutter speed is as shown below.

| Shutter speeds | Data | Shutter speed | Data |
|---|---|---|---|
| 1/1000 sec | 0000 | ¼ sec | 0001 |
| 1/500 sec | 1000 | ½ sec | 1001 |
| 1/250 sec | 0100 | L1 (1 sec) | 0101 |
| 1/125 sec | 1100 | L2 | 1101 |
| 1/60 sec | 0010 | L3 | 0011 |
| 1/30 sec | 1010 | L4 | 1011 |
| 1/15 sec | 0110 | Bulb | 0111 |
| ⅛ sec | 1110 | * | 1111 |

Figure 3:
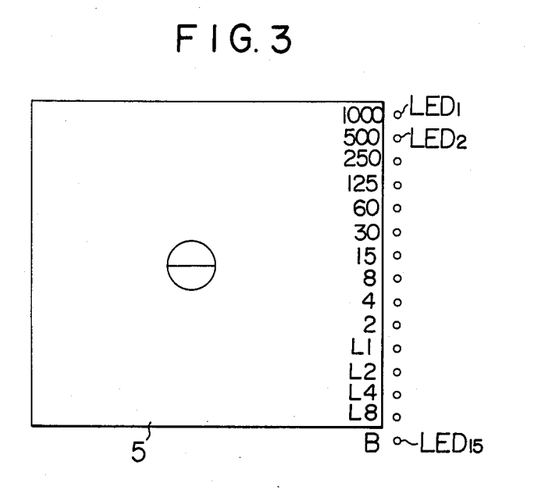
FIG. 3 is a schematic illustration of a viewfinder of the camera of FIG. 1.

The data applied to the counter CNT from the terminals A to D are set, for instance at 0010, which corresponds to 1/60 sec. The data of the counter CNT are decoded by a 4-15 decoder DEC and are then applied to a display apparatus DP. The display apparatus DP comprises light emission diodes $LED_1$ to $LED_{15}$ and resistors $R_{23}$ to $R_{37}$ and, as shown in FIG. 3, the diodes $LED_1$ to $LED_{15}$ are actuated by the respective inputs of the decoder DEC, so that one of the light emission diode is lighted, which indicates one shutter speed index out of settings shown as 1000 to B, whereby one shutter speed out of fifteen shutter speeds (1/1000 sec. to Bulb) is displayed. A button switch SW2 for setting a shutter speed is for changing the shutter speed displayed in the display apparatus DP, and is depressed for operation. An input circuit 14 comprising the button switch SW2, a resistor $R_{38}$ and an inverter $INV_{11}$ generates a pulse whenever the switch SW2 is depressed, and applies the pulse to a terminal $\phi$ of the counter CNT. The counter CNT counts up the pulses so that the setting of the shutter speed is changed. When the counter CNT counts up to 1111, the output of an AND circuit $AND_2$ goes H and the output of an AND circuit $AND_3$ goes H, as a result, the counter CNT is cleared by a clear terminal becoming H, so that the shutter speed is set at 1/1000 sec. At this moment, since the switch SW1 is opened, the output of an inverter $INV_2$ is L and the output of a NAND circuit NAND is L. Thus, transmission of a signal from the AND circuit $AND_2$ to a LOAD terminal is prohibited. Thus, by operating the switch SW2, a desired shutter speed is selected so that it can be registered in the counter CNT. A time converter circuit 15 serves to convert the output of the decoder DEC to a shutter speed and to actuate a transistor Tr and energize a magnet Mg to release a back blind of the shutter.

In the time converter circuit 15, a circuit comprising a trigger switch TRI, a resistor $R_{39}$ and an inverter $INV_{13}$ normally resets a 4-bit counter 16 for preventing chance errors and the flip-flop $FF_1$ to $FF_{14}$ by an output of the inverter INV with the trigger switch TRI on. However, when the trigger switch TRI is off by the running of a front blind of the shutter, the resetting of the 4-bit counter 16 and the flip-flops $FF_1$ to $FF_{14}$ is released and, at the same time, the counter 16 begins to count clock pulses from the oscillator $OSC_{13}$ and the output of the counter 16 is applied to the flip-flop $FF_1$ through an AND gate $G_1$ and, at the same time, it is also applied to the flip-flops $FF_2$ to $FF_{14}$ through AND gates $G_2$ to $G_{14}$ and OR circuits $OR_1$ to $OR_{13}$. The AND gates $G_1$ to $G_{14}$ are opened by the outputs of the decoder DEC corresponding to the shutter speeds of the 8 sec. to 1/1000 sec. and the respective outputs of the flip-flops $FF_1$ to $FF_{13}$ are applied to the respective flip-flops $FF_2$ to $FF_{14}$ through the respective OR circuits $OR_1$ to $OR_{13}$. Therefore, the output of the flip-flop $FF_{14}$ is generated after a period of time corresponding to the output of the decoder DEC after the trigger switch TRI is off and is applied to the transistor Tr through an inverter $INV_{14}$ and a resistor $R_{40}$, whereby the transistor Tr is switched off and a magnet Mg is deenergized so that the back blind of the shutter is released.

When a stroboscope or flashlight source is attached to the single-lens reflex camera, the switch $SW_1$ is closed and the output of the circuit 11 becomes L, which is differentiated by a differentiating circuit 17 comprising a capacitor $C_2$, a resistor $R_{41}$ and a resistor $R_{42}$ and is then applied to the AND circuit $AND_1$, whereby the LOAD terminal of the counter CNT temporarily becomes L so that the data are introduced into the A to D terminals from the previously mentioned data input circuit. The data correspond to the highest shutter speed that can be synchronized with the stroboscope. The switch thus acts as a flash light source detecting means with the circuits 17 and 12 acting as a shutter speed restricting means. The value of the counter CNT can be changed to a value corresponding to a desired shutter speed by operating the switch $SW_2$. When the value of the counter CNT becomes 1111, at terminals a–d the output of the circuit $AND_2$ becomes H. This causes the output of the NAND circuit NAND to become L, thus causing AND gate $AND_2$ to apply L to the LOAD terminal of the counter CNT. Therefore, the counter CNT again introduces the input data from the terminals A to D. At this moment, the output of the circuit $AND_3$ is L and transmission of a signal to the clear terminal of the counter CNT is prohibited. Thus, the shutter speeds which can be set are limited to the range of from 1/60 sec. to Bulb, so that mistakes in connection with synchronizing the stroboscope are obviated.

Figure 10:
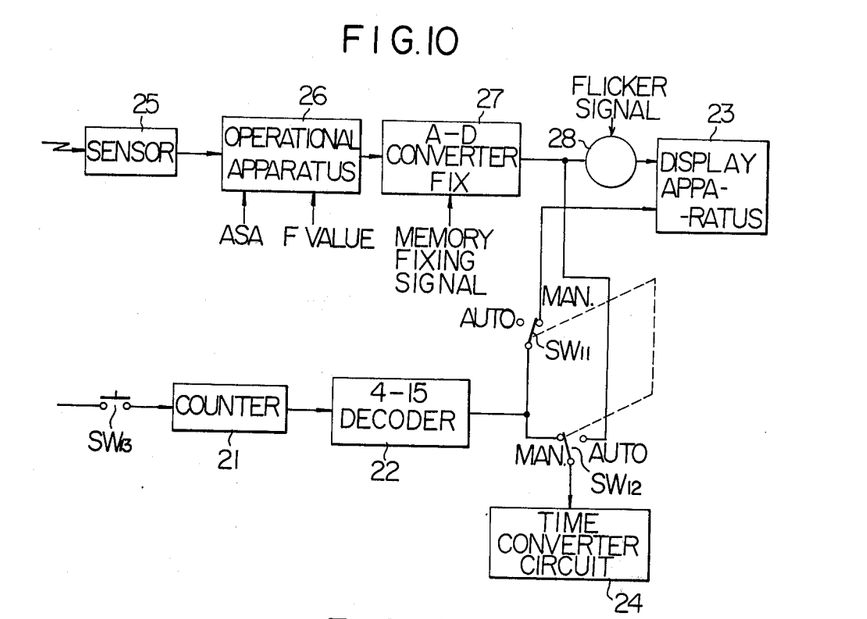
FIG. 10 is a block diagram of a further embodiment of the invention.

Referring to FIG. 10, in a single-lens reflex camera, when mode selection switches $SW_{11}$ and $SW_{12}$ are switched to AUTO in order to set the camera at an exposure adjustment mode, a manual setting circuit comprising a button switch $SW_{13}$ for manual setting of a shutter speed, a counter 21 and 4-15 decoder 22 are disconnected from a display apparatus 23 and a time converter circuit 24. A sensor 25, an operational apparatus 26 and a 4-bit A/D converter 27 constitute an exposure adjustment circuit. The sensor 25 measures the brightness of a subject by receiving a light from the camera lens.

Figure 11:
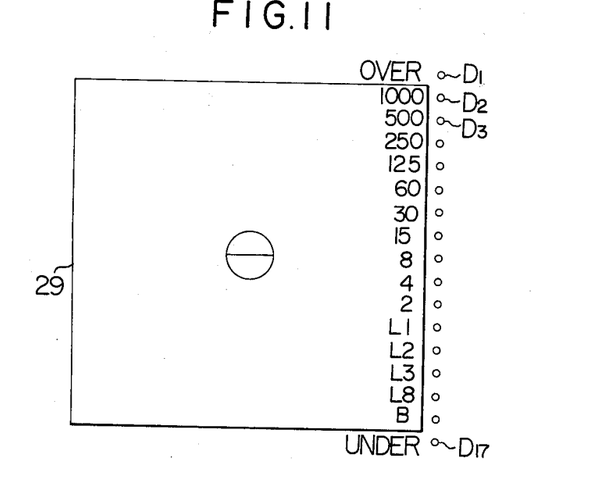
FIG. 11 is a schematic illustration of a display apparatus of the embodiment of FIG. 10.

The operational apparatus 26 sets a shutter speed by adding the value of a film sensitivity (ASA) and an F value, which have been set manually by variable resistors (not shown), to a signal from the sensor 25 or by substracting the value of a film sensivitity and the F value from a signal from the sensor 25. The A/D converter 27 converts an output signal of the operational apparatus 26 into a digital value. However, when a mirror of the camera flips up by depressing a shutter button (not shown), a memory fixing signal is applied to a terminal FIX of the A/D converter 27, whereby the A/D converting operation of the A/D converter 27 is stopped and an A/D conversion value is held. The output signal of the A/D converter 27 passes through a gate circuit 28 and is displayed in a viewfinder 29 (FIG. 11) by the display apparatus 23. As shown in FIG. 11, the display apparatus 23 is a digital type apparatus comprising a plurality of light emission diodes such as diodes $D_1$ to $D_{17}$ and, in the viewfinder 29, one of the diodes $D_1$ to $D_{17}$ is lighted by an output signal of the gate circuit 28 and one of OVER index, 1000 to B indexes, and UNDER index is indicated, so that one of indications of over-exposure, shutter speeds of 1/1000 sec. to Bulb, and under-exposure is indicated. A time converter circuit 24 converts a signal applied to the time converter circuit 24 from the A/D converter through the switch $SW_{12}$ by the flipping up of the mirror into a shutter speed, and actuates a magnet (not shown) so that a back blind of the shutter is released.

On the other hand, when the switches $SW_{11}$, $SW_{12}$ are switched to a manual side MAN so as to be set at a manual indication mode, the A/D converter 27 is disconnected from the converter circuit 24 and, at the same time, the 4-15 decoder 22 is connected to both the display apparatus 23 and the time converter circuit 24 by the switches $SW_{11}$, $SW_{12}$. In this case, whenever a switch $SW_{13}$ is depressed, a pulse is generated and is counted by the counter 21 so that a value corresponding to a desired shutter speed can be set in the counter 21 by the switch $SW_{13}$. An output of the counter 21 is decoded by the 4-15 decoder and is applied to the display apparatus 23 through the switch $SW_{11}$ so that the output of the counter 21 is displayed in the viewfinder 29. In this case, the display apparatus 23 displays the shutter speed set by the manual indication circuit by lighting continuously one of the diodes $D_1$ to $D_{17}$, and a gate circuit 28 is opened and closed alternatively by a flicker signal from an oscillator (not shown), whereby the shutter speed set by the exposure adjustment circuit is flickeringly displayed. At this moment, both shutter speed can be distinguished since one is displayed continuously and the other is displayed flickeringly. The time converter circuit 24 converts an output signal from the decoder 22 into a shutter speed by the flipping up of the mirror, whereby the magnet (not shown) is actuated.

Figure 12A:
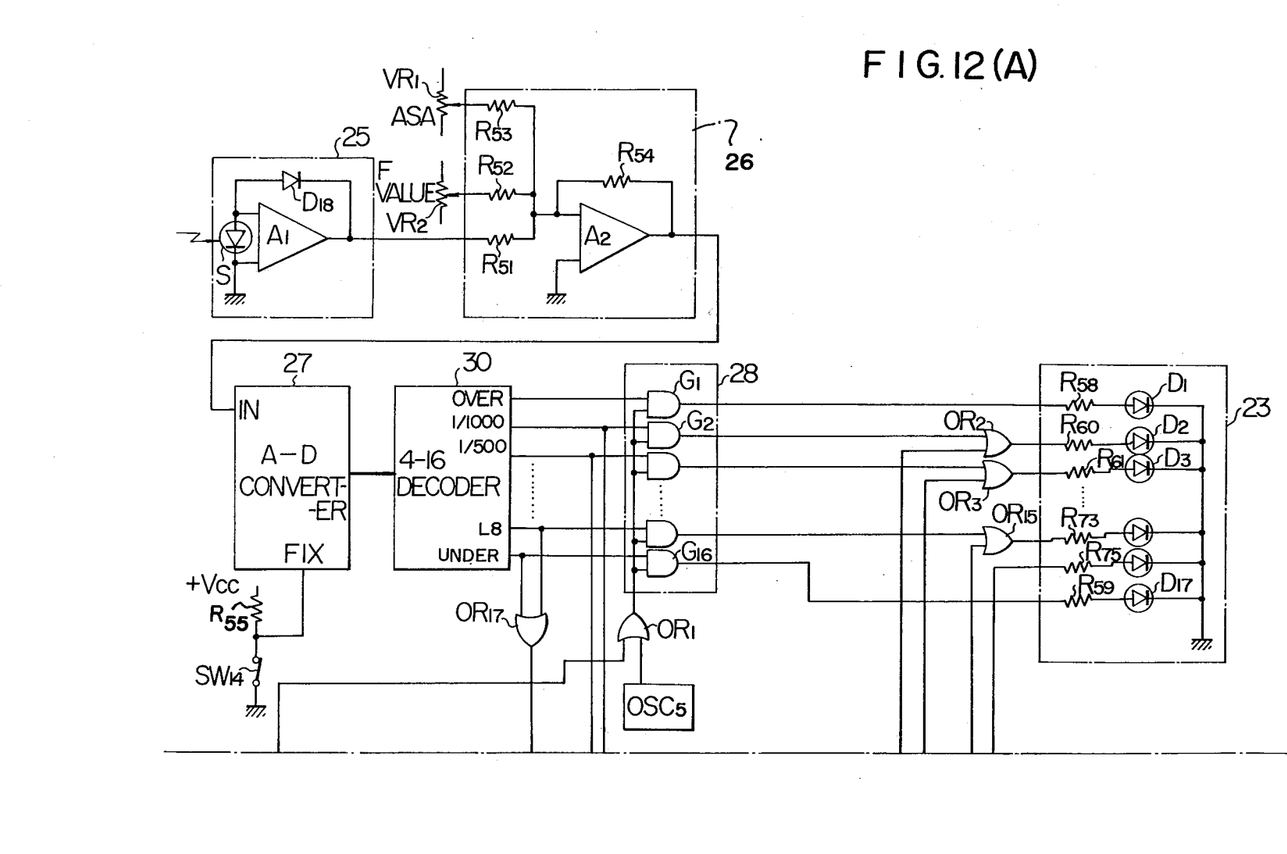
FIGS. 12(A), 12(B), 13(a) and 13(B) are circuit diagrams of further embodiments of the invention.
Figure 12B:
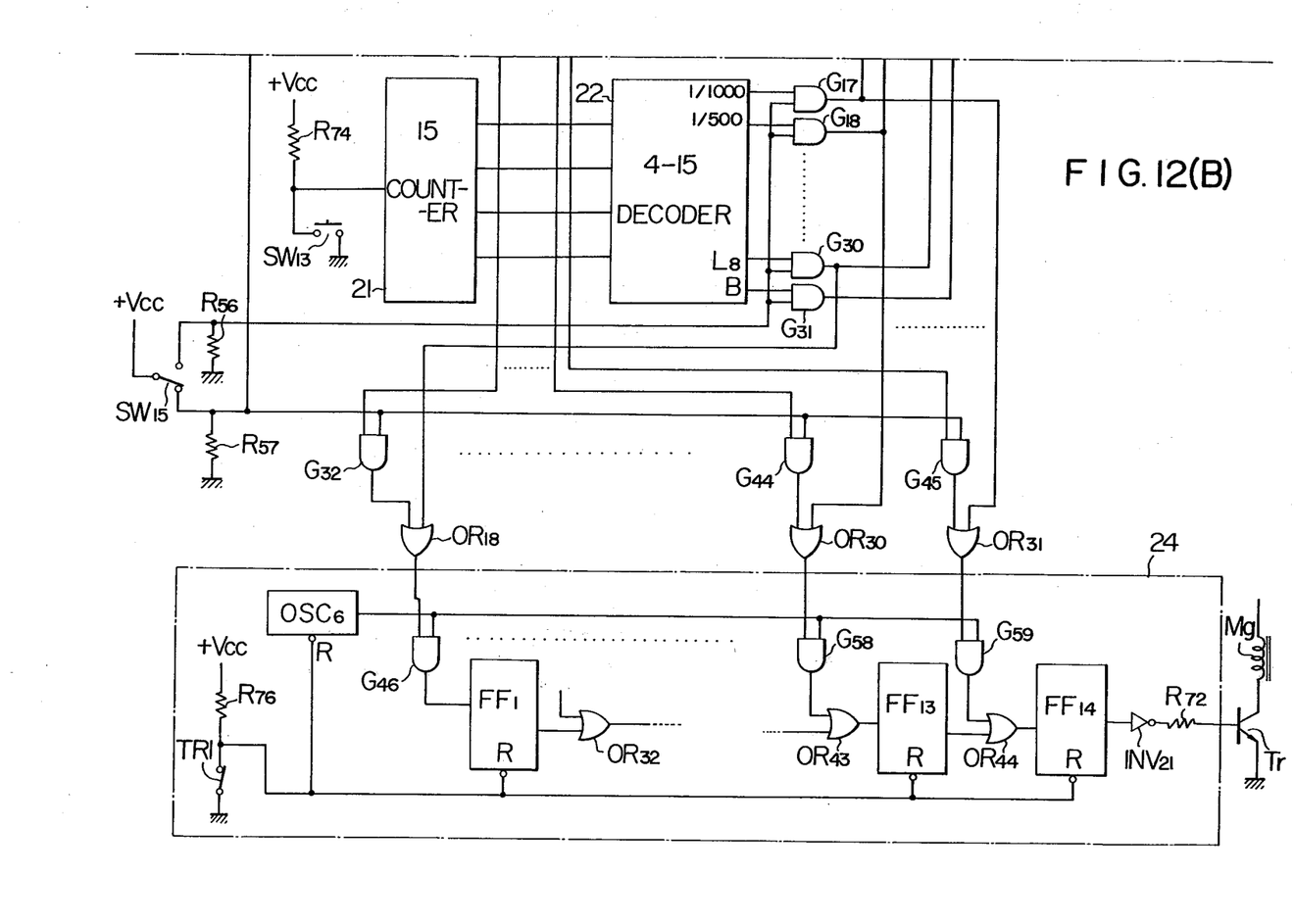

Referring to FIGS. 12(A) and 12(B), (top and bottom portions of the circuit respectively) there is shown a further embodiment of the invention. In FIG. 12(A), the sensor 25 comprises a light receiving element S for receiving light from a camera lens (not shown), an operational amplifier $A_1$ and diode $D_{18}$ and measures the brightness of a subject. The operational apparatus 26 comprises an operational amplifier $A_2$ and resistors $R_{51}$ to $R_{54}$ and either adds the value of a film sensitivity and an F value, which have been set manually by variable resistors $VR_1$, $VR_2$, respectively, to an output signal of the sensor 25, or substracts them from the output signal of the sensor 25. The A/D converter 27 converts an output signal of the operational apparatus 26 into a digital value but, when a memory fixing signal is applied to the A/D converter 27 by a circuit comprising a switch $SW_{14}$ which is actuated by the flipping up of the mirror and a resistor $R_{55}$, the A/D conversion action of the A/D converter 27 is stopped, whereby the A/D conversion value is held. Each output signal of the A/D converter 27 is detected by a 4-16 decoder 30 and each output signal of the 4-16 decoder 30 is applied to AND gates $G_1$ to $G_{16}$, respectively, which constitute a gate circuit 28. The gates $G_1$ to $G_{16}$ are opened and closed by a flicker signal applied by an oscillator $OSC_5$ through an OR circuit $OR_1$. In the embodiment shown in FIG. 10, the manual setting mode and the automatic setting mode are selected by the two switches $SW_{11}$, $SW_{12}$. However, in the present embodiment, the two modes can be selected by one switch $SW_{15}$ shown in FIG. 12(B). A circuit in FIG. 12(B) comprising the switch $SW_{15}$, resistors $R_{56}$, $R_{57}$ generates a manual setting mode signal when the switch $SW_{15}$ is switched to a manual side, but generates an automatic setting mode signal when switched to an automatic side.

To the AND gates $G_1$ to $G_{16}$ (FIG. 12(A)) is applied the automatic setting mode signal through the circuit $OR_1$ and, in the case of the automatic setting mode, the AND gates $G_1$ to $G_{16}$ are held open. The output signal of the gates $G_2$ to $G_{15}$ are respectively applied to light emission diodes $D_2$ to $D_{15}$ through circuits $OR_2$ to $OR_{15}$ and resistors $R_{60}$ to $R_{73}$, respectively. A circuit comprising a switch $SW_{13}$ and a resistor $R_{74}$ generates a pulse and applies it to the 15 counter 21 whenever the switch $SW_{13}$ is depressed. The output of the counter 21 is decoded by the decoder 22 and the output signals of the decoder 22 are respectively applied to AND gates $G_{17}$ to $G_{31}$. The gates $G_{17}$ to $G_{31}$ are opened by the above-mentioned manual setting mode signal. The outputs of the gates $G_{17}$ to $G_{30}$ are applied to diodes $D_2$ to $D_{15}$ through OR circuits $OR_2$ to $OR_{15}$ and resistors $R_{60}$ to $R_{73}$, respectively, and the output of an AND gate $G_{31}$ is applied to diode $D_{16}$ through a resistor $R_{75}$. When the outputs of the decoder 30 corresponding to 8 sec. of shutter speed and under-exposure are applied to an AND gate $G_{32}$ through an OR circuit $OR_{32}$ and, at the same time, the output of the decoder 30 corresponding to 4 sec. to 1/1000 sec. of the shutter speed are respectively applied to AND gates $G_{33}$ to $G_{45}$, the gates $G_{32}$ to $G_{45}$ are opened by the above-mentioned automatic setting mode signal. In the time converter 24, a circuit comprising a trigger switch TRI and a resistor $R_{76}$ normally resets an oscillator $OSC_6$ and flip-flops $FF_1$ to $FF_{14}$ with the trigger switch TRI on. However, when the trigger switch TRI is on by the running of a front blind of the shutter (not shown), the resetting of the oscillator $OSC_6$ and the flip-flops $FF_1$ to $FF_{14}$ is released. The outputs of the AND gates $G_{32}$ to $G_{45}$ are applied to AND gates $G_{46}$ to $G_{59}$ through OR circuits $OR_{18}$ to $OR_{31}$, respectively, and, at the same time, the outputs of the AND gates $G_{30}$ to $G_{17}$ are applied to AND gates $G_{46}$ to $G_{59}$ through circuits $OR_{18}$ to $OR_{31}$. The oscillator $OSC_2$ generates a clock pulse when the resetting is released, and the clock pulse is applied to the flip-flop $FF_1$ through the AND gate $G_{46}$ and, at the same time, it is applied to the flip-flops $FF_2$ to $FF_{14}$ through the AND gates $G_{47}$ to $G_{59}$ and the respective OR circuits $OR_{32}$ to $OR_{44}$. The outputs of the flip-flops $FF_1$ to $FF_{13}$ are respectively applied to the flip-flops $FF_2$ to $FF_{14}$ through the OR circuits $OR_{32}$ to $OR_{44}$. Therefore, the output of the flip-flop $FF_{14}$ is generated after a period of time corresponding to the output of the decoder 22 or that of the decoder 30 after the trigger switch TRI is off, and is applied to the base of a transistor Tr through an inverter $INV_{21}$ and a resistor $R_{77}$. Therefore, a back blind of the shutter (not shown) is released when a magnet M is deenergized with the transistor Tr off.

Figure 13A:
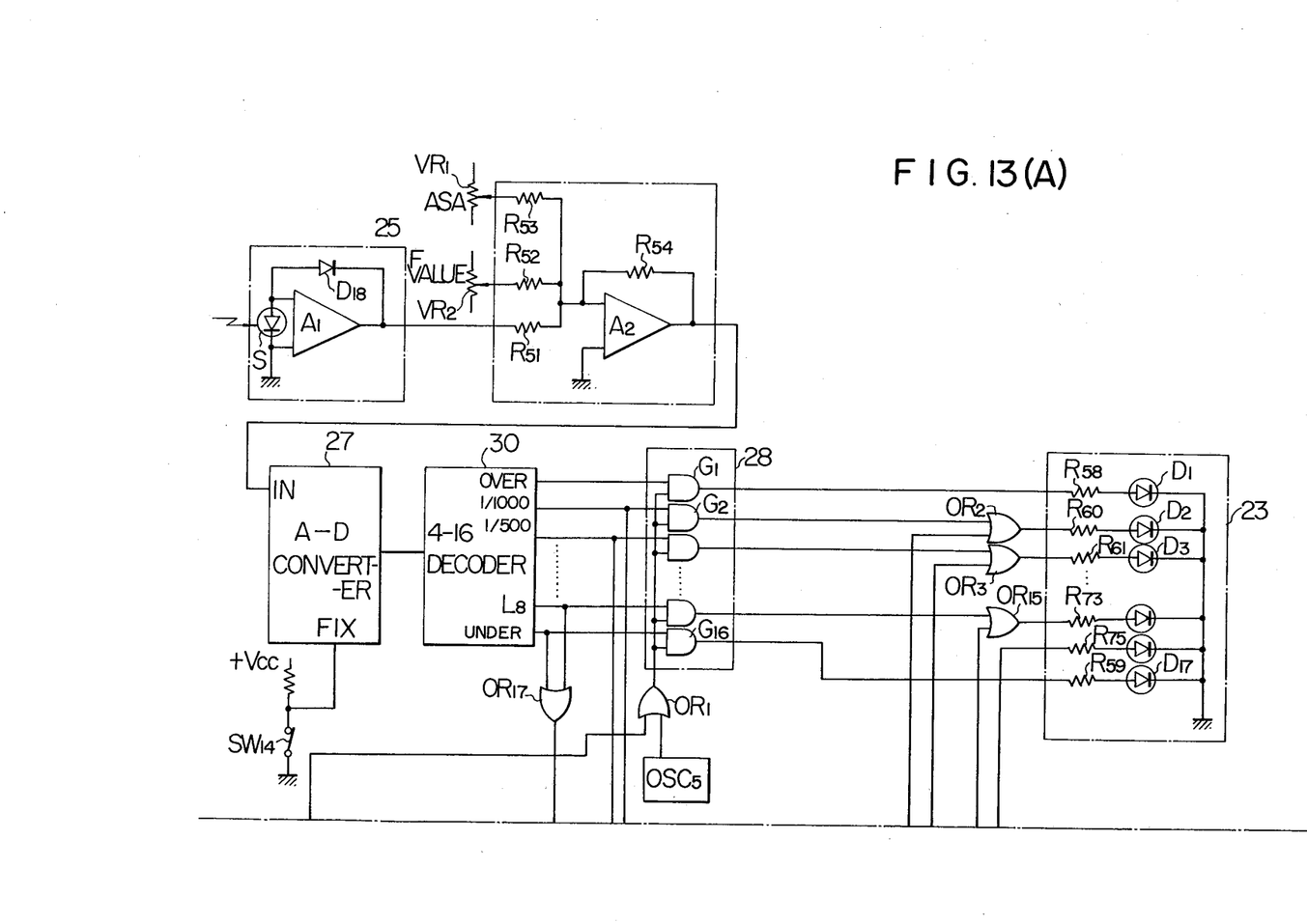
Figure 13B:
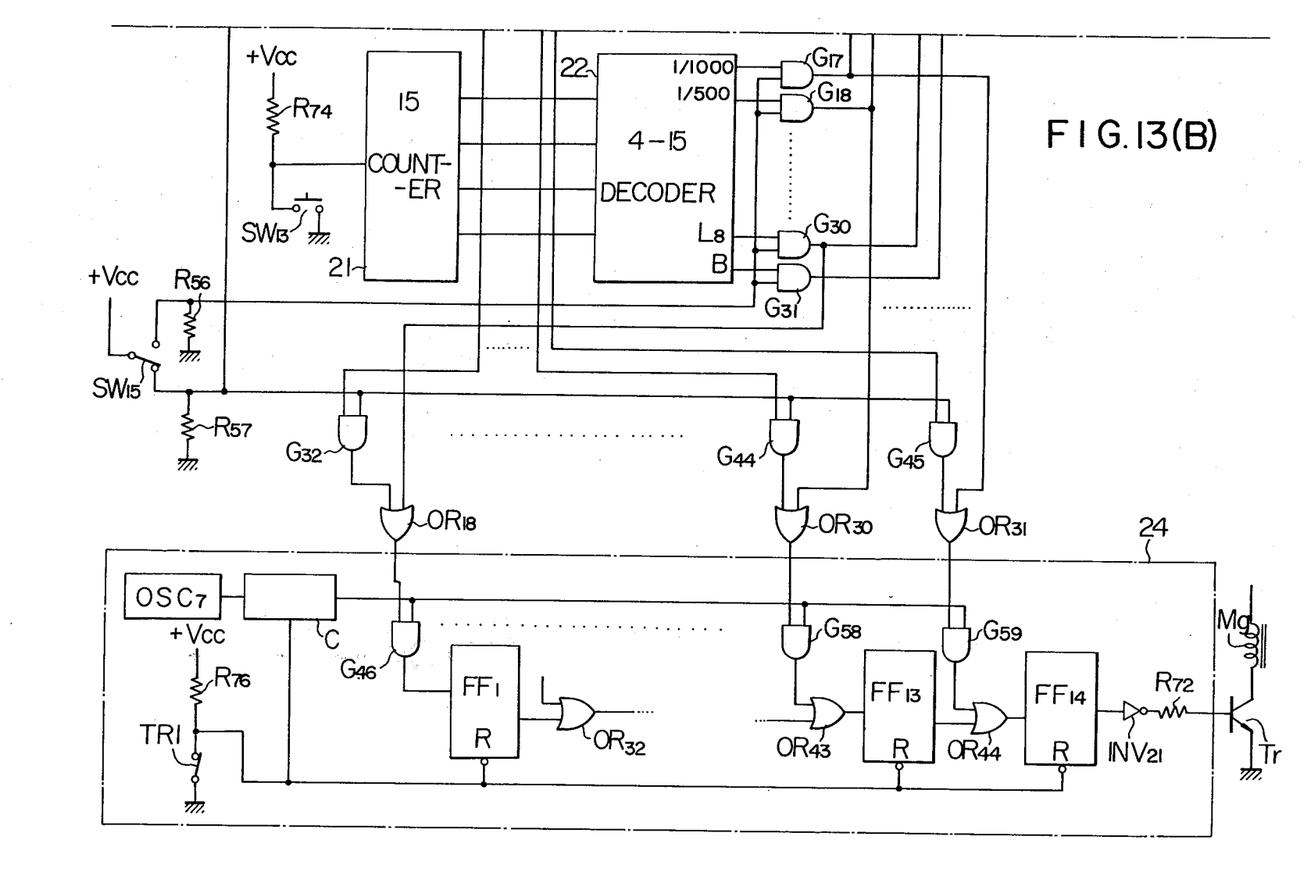

In a further embodiment of the invention, (FIGS. 13(A) and 13(B)) a time converter circuit 24, employing a 4-bit counter C, is utilized instead of the time converter circuit 24 in the above-mentioned embodiment. A circuit comprising a trigger switch TRI, a resistor $R_{76}$ and an inverter $INV_{21}$ normally resets the counter C and the flip-flops $FF_1$ to $FF_{14}$ by an output of the inverter $INV_{21}$ with the trigger switch TRI on. However, when the trigger switch TRI is off by the running of a front blind of the shutter (not shown), the resetting of the counter C and the flip-flops $FF_1$ to $FF_{14}$ is relased. The counter C begins to count a clock pulse from an oscillator $OSC_7$ when the resetting is released, and the output of the counter C is applied to the AND gates $G_{46}$ to $G_{59}$. Chance errors of the output of the flip-flop $FF_{14}$, which may occur in relation with the output of the oscillator $OSC_7$ and the timing for the trigger switch TRI to be turned off, can be obviated by the counter C.

While specific embodiments of the invention have been shown and described in detail to illustrate the application of the principles of the invention, it will be understood that the invention may be embodied otherwise without departing from such principles.

What is claimed is:

1. A shutter speed setting and display apparatus for use in a camera, comprising:
   (a) an electrical pulse generator for generating pulses at a rate slow enough to manually select any number of said pulses within an operating range of numbers of said pulses;
   (b) an up-down counter for counting said pulses to a selected count value within said range, said up-down counter having an up-count input terminal and a down-count input terminal;
   (c) a first AND gate having one input connected to said pulse generator and an output connected to said up-count input terminal of said counter;
   (d) a second AND gate having one input connected to said pulse generator and an output connected to said down-count input terminal of said counter;
   (e) first and second manually controlled push-button switches connected to another input of said first and second AND gates respectively for allowing pulses from said pulse generator to be transmitted to said counter as long as one of said manually controlled push button switches is depressed to establish a count value in said counter;
   (f) decoding means connected to said counter to transform the selected count value of said pulses to a speed-controlling signal;
   (g) shutter speed operating means connected to said decoding means to be controlled by said speed-controlling signal; and
   (h) visible display means connected to said decoding means to be controlled thereby to indicate visually and in sequence the speed value corresponding to said selected count value.

2. The invention as defined in claim 1, in which said decoding means comprises: a first decoder connected to said counting means to receive the count value therefrom: said display means comprising a plurality of lights arranged to indicate shutter speed values, said display means being connected to said first decoder to receive therefrom signal voltages to illuminate appropriate ones of said lights according to the count value received from said counting means; and a second decoder connected to said counting means to receive the count value therefrom, said operating means comprising time conversion means connected to said second decoder to generate a shutter-controlling signal having a duration corresponding to the count value received from said counting means.

3. The invention as defined in claim 1, in which said display means is digital display apparatus, said invention further comprising automatic exposure measurement circuit means comprising: a sensor to measure the brightness of a subject to be photographed; operational apparatus means for setting a shutter speed based on an output signal of said sensor; analog-to-digital converter means to convert an output signal of said operational apparatus means into a second signal having a digital value; and connecting means to connect said analog-to-digital converter means to said shutter operating means to control the shutter speed automatically.

4. The invention as defined in claim 3, in which said connecting means is also connected to said decoding means to connect, alternatively, said decoding means to said shutter operating means and to said display means, or said analog-to-digital converter to said shutter operating means to operate said display apparatus according to either of said signals having a digital value.

5. The invention as defined in claim 4, comprising, in addition: means to generate a flicker signal; and gating means to connect one of said signals having a digital value to said display apparatus, said means to generate a flicker signal being connected to control said gating means to cause said digital display apparatus to produce a flickering display of the shutter speed value corresponding to the digital value signal passing through said gating means.

6. A shutter speed setting and display apparatus for use with a camera, said apparatus comprising:
   manually operated push button switch means to generate a series of electrical pulses manually controllable in number;
   shutter operating means responsive to a timing signal for actuating a camera shutter at any of a plurality of shutter speeds;
   counting means connected to said switch means to count said electrical pulses;
   display means to display visible shutter speed values, said display means comprising means to generate a display-actuating signal having a digital value; and
   decoding means connected to said display means to cause said display means to display, in sequence, a plurality of shutter speeds corresponding to the number of electrical pulses counted up to the time of display of each of said shutter speeds, said switch means being capable of being stopped at any number of said electrical impulses corresponding to a display shutter speed value, said decoding means being connected to said shutter operating means to generate said timing signal to produce any shutter speed value within said plurality of shutter speeds and corresponding to the shutter speed value displayed by said display means;
   said decoding means comprising a plurality of decoding output terminals, each corresponding to a specific shutter speed;
   said shutter operating means comprising: a shutter actuating output circuit; an oscillator; flip-flop means connected to said oscillator to be actuated thereby and connected to said shutter actuating output circuit to actuate the same; and gate means connecting said decoding output terminals selectively to said flip-flop means to control the operation thereof to convert output signals of said decoding output terminals to timing signals to control said shutter actuating output circuit at selected shutter speeds;
   said flip-flop means comprising a plurality of N flip-flops, corresponding in number to the number N of selectable shutter speeds, from a first flip-flop corresponding to the lowest shutter speed to an Nth flip-flop corresponding to the highest shutter speed;
   said gate means comprises: N first gates, each comprising a first input terminal connected to said oscillator; an enabling input terminal connected to a corresponding one of said decoding output terminals, and an output terminal; and N-1 second gates, each comprising first and second input terminals and an outer terminal, the output terminal of the first one of said first gates being connected to a triggering input terminal of said first flip-flop and the output terminals of the 2nd through Nth first gates being connected to the first inout terminal of the first through (N-1)th second gates, respectively, an output terminal of the first through (N-1)th flip-flops being connected to the second input terminal of the first through (N-1)th second gates, respectively, and the output terminal of said first through said (N-1)th second gates being connected to a triggering input terminal of the 2nd through Nth flip-flops, respectively, an output terminal of said Nth flip-flop being connected to said shutter actuating mechanism.

* * * * *